United States Patent [19]

Snelling

[11] Patent Number: 4,839,670
[45] Date of Patent: Jun. 13, 1989

[54] SYNCHRONIZED APERTURE MOTION IONOGRAPHY

[75] Inventor: Christopher Snelling, Penfield, N.Y.
[73] Assignee: Xerox Corporation, Stamford, Conn.
[21] Appl. No.: 191,511
[22] Filed: May 9, 1988
[51] Int. Cl.$^4$ ............................................. G01D 15/06
[52] U.S. Cl. .................................... 346/153.1; 355/77; 355/219; 355/211; 101/1; 101/494
[58] Field of Search ................. 355/3 R, 3 SC, 3 CH, 355/77, 14 CH; 346/153.1, 154; 101/1, DIG. 13

[56] References Cited

U.S. PATENT DOCUMENTS

| 4,046,466 | 9/1977 | Ando et al. | 355/3 R |
| 4,365,549 | 12/1982 | Fotland et al. | 101/1 |
| 4,430,661 | 2/1984 | Tarumi et al. | 346/153.1 |
| 4,494,129 | 1/1985 | Gretchev | 346/154 |
| 4,593,994 | 6/1986 | Tamura et al. | 355/3 SC |
| 4,658,275 | 4/1987 | Fujii et al. | 346/154 |
| 4,697,196 | 9/1987 | Inaba et al. | 346/154 |

FOREIGN PATENT DOCUMENTS

| 54-15747 | 2/1979 | Japan | 355/3 SC |
| 54-54637 | 5/1979 | Japan | 355/3 SC |

OTHER PUBLICATIONS

"Photo-Controlled Ion Flow Electrophotography", G. L. Pressman; Second International Conference on Electrophotography; Wash. DC, Oct. 1973.

Primary Examiner—R. L. Moses
Attorney, Agent, or Firm—Frederick E. McMullen

[57] ABSTRACT

A high speed digital ionographic printer employing an ion deposition control bar interposed between the ion source and the movable charge receptor, the bar having n parallel rows of apertures each with a ring-like control electrode, the aperture rows being perpendicular to the direction of movement of the charge receptor, a combination of n line buffers and n shift registers associated with control switches for providing preset negative or positive modulating potentials to the aperture control electrodes in accordance with the image pixel content of the n lines of image signals currently in the shift registers to provide controlled ion flow through the apertures with partial ion deposition on the charge receptor of n lines at once, the block of n image lines being stepped by one each time the charge receptor moves one line.

10 Claims, 5 Drawing Sheets

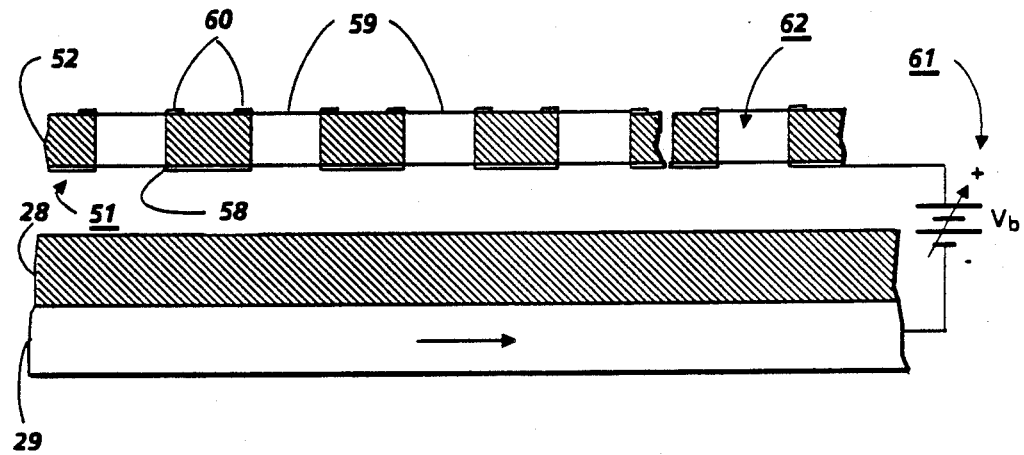
FIG. 4
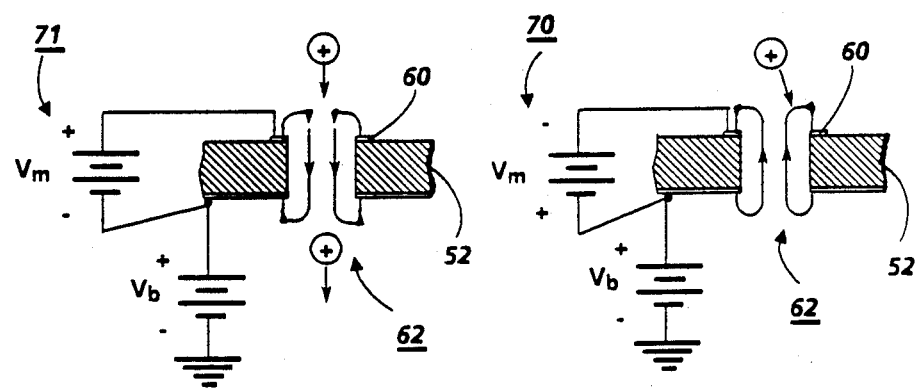
FIG. 6 FIG. 7

SYNCHRONIZED APERTURE MOTION IONOGRAPHY

The invention relates to ionographic type printers, and more particularly, to improved high speed ionographic printers with synchronously progressive ion deposition.

Electrographic transfer or ionographic printers of the type shown in U.S. Pat. No. 4,365,549 to Fotland et al employ a dielectric charge receptor which is typically a conductive drum having a dielectric covering or layer on which latent electrostatic images of the image being printed are created by means of an ion deposition process. Following this, the latent image is developed at a developing station and then transferred to and fixed on a copy sheet to provide the finished print.

To create the latent electrostatic image through ion deposition a source of ions,, referred to generally as an ion generator, is provided. A control electrode, which is interposed between the ion source and the charge receptor, regulates the flow of ions to the charge receptor in response to an image signal input representative of the image to be printed.

However, processing speed in ionographic printers of the type discussed is limited by the ability of the ion deposition subsystem to deposit charges in sufficient magnitude onto the charge receptor for the specific development system of the printer. In current ionographic printers, the size of the ion deposition aperture is fixed. Thus, the ion deposition time is limited by the relationship between the effective width of the ion deposition aperture and system processing speed. Increasing the processing speed with fixed aperture systems therefore requires that ion current density be similarly increased.

In the ionographic arts, U.S. Pat. No. 4,046,466 to Ando et al discloses an electrophotographic system employing a light-lens exposure to expose a transfer screen. The Ando system, however, requires a special three-layer screen composed of a first or substrate layer, a second photoconductive layer, and a third insulator layer with attendant and relatively complex processing system in which the screen is first charged, then simultaneously imaged and discharged by a corotron, and then exposed to uniform light radiation in order to form the temporary latent electrostatic image used to modulate ion deposition onto the Ando charge receptor.

Other prior art patents in this field include U.S. Pat. No. 4,494,129 to Gretchev in which a print cartridge having offset ion deposition orifices is disclosed; U.S. Pat. No. 4,430,661 to Tarumui et al in which an ionographic apparatus having a ion current modulation electrode divided into plural blocks for parallel image signal input is disclosed; Japanese application No. 54-15747 Ando in which a two speed ionographic system is disclosed that rotates the photosensitive screen at a first slower speed while the electrostatic image is formed thereon, and at a second higher speed while ion flow to the image receiving member is modulated; and Japanese Application No. 54-54637 to Yoshida where an ionographic apparatus is disclosed having a shield interposed between the image bearing screen and the image receiving member. And, "Photo-controlled Ion Flow Electtophotography" by G.L. Pressman (Second International Conference on Electrohpography, Washington D.C., Oct. 24-27, 1973), discusses a method in which electrostatic fields are established in apertures that control the trajectory of charged particles to control the diameter of the ion stream.

In contrast to the prior art, the present invention provides a high speed digital ionographic printing apparatus, comprising in combination: an ion generator; a movable charge receptor; an ion deposition control bar operatively interposed between the ion generator and the charge receptor for modulating the flow of ions produced by the ion generator to the charge receptor, the control bar having n parallel rows of apertures therethrough extending in a direction substantially perpendicular to the direction of movement of the receptor, each of the apertures being delineated by a controll electrode for controlling the flow of ions through the apertures; a source of image signals for providing images for printing; image signal processing means for separating the image signals into successive lines and providing a block of n lines for use in controlling the flow of ions through the rows of apertures; line stepping means operative on each movement of the charge receptor through a distance of one line to step the position of the lines in the block of lines by one step while providing the next successive line of image signals to the first step in the block of lines and discarding the last line in the block lines; modulating means for modulating the electrodes, the modulating means providing a first modulating potential facilitating the flow of ions through the apertures and a second modulating potential inhibiting the flow of ions through the apertures; and control means for selectively coupling the first or second modulating potentials to the electrodes individually in accordance with the image signal content to the lines in the block of lines whereby to provide a controlled line build-up of ions on the charge receptor in accordance with the image signal content of the lines in the block of lines.

IN THE DRAWINGS:

FIG. 4 is an enlarged cross sectional view of the control bar shown in FIG. 3;

FIG. 6 is a schematic view illustrating the case where the electrode of an ion controlling aperture is biased positive relative to the charge receptor to drive ions through the aperture toward the charge receptor;

Figure 8:
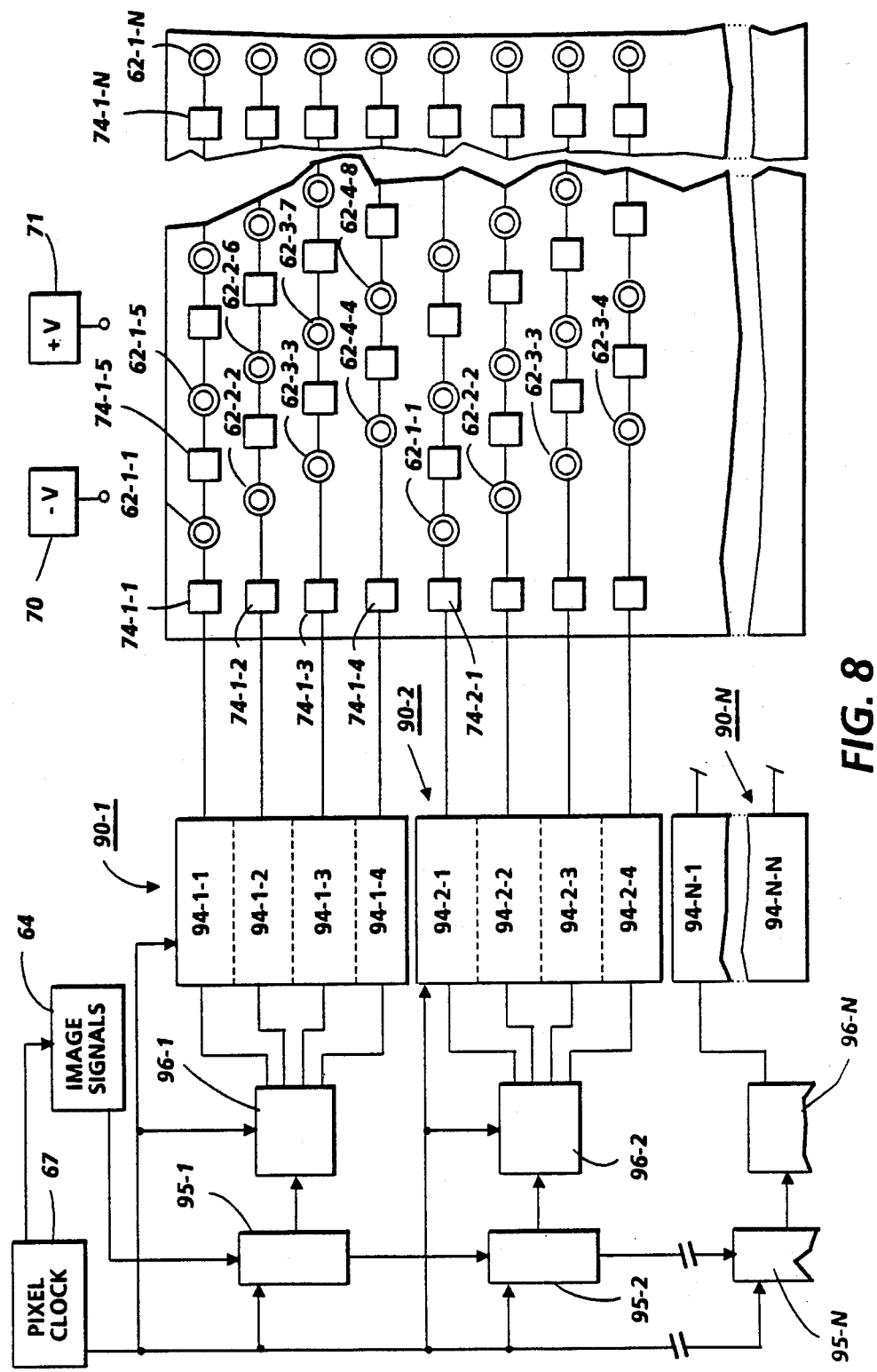

FIG. 7 is a schematic view illustrating the case where the electrode of an ion controlling aperture is biased negative relative to the charge receptor to divert ions from the aperture and prevent deposition of ions on the charge receptor surface; and FIG. 8 is a control schematic of an alternate control system for operating the control bar to achieve progressive deposition of ions on the printer charge receptor in accordance with an image signal input. Referring to FIGS. 1-4 of the drawings, an ionographic type printer, designated generally by the numeral 10, of the present invention is there shown. Printer 10 has a dielectric charge receptor 27 in the form of a conductive drum or cylinder 29 having an electrostatically chargeable dielectric covering or dielectric layer 28. Charge receptor 27 is suitably supported for rotation in the direction shown by the solid line arrow in a suitable housing (not shown). A pressure cylinder or roller 30 is rotatably supported below charge receptor 27 and in operative relation thereto at transfer-fixing station 25, roller 30 cooperating with charge receptor 27 to define a nip through which copy sheets 32 pass.

Roll pair 34 on the upstream side of transfer/fixing station 25 and roll pair 36 on the downstream side of transfer/fixing station 25 are provided for bringing copy sheets 32 into and out of transfer relation with charge receptor 27 at transfer/fixing station 25. Copy sheets 32 are supplied from a suitable source such as a paper tray (not shown) having sheet feeder means and activated to advance the copy sheets(s) forward in timed registered relation with the images on charge receptor 27 to roll pair 34 for feeding to transfer/fixing station 25.

A magnetic developer roll 40 is provided at a developing station 39 for developing the latent electrostatic images formed on charge receptor 27 prior to transfer. Developer roll 40 is rotatably mounted within a developer housing having a supply of toner for use in developing the electrostatic images on surface 28 of charge receptor 27 therein. Developer roll 40 rotates in a direction opposite to that of charge receptor 27 as shown by the dotted line arrow. Charge receptor 27, pressure roller 30 roll pairs 34, 36, and magnetic developer roll 40 are suitably drivingly coupled to and rotated by a suitable motor 42.

To remove residual or leftover toner powder from the periphery of charge receptor 27, a scraper blade 45 is provided, blade 45 engaging against the surface of charge receptor 27 to wipe toner therefrom. A suitable erase apparatus 46 is provided downstream of blade 45 to discharge any leftover charges remaining on charge receptor 27.

While the charge receptor of printer 10 is shown and described in the form of a drum, other charge receptor types such as a belt may be envisioned.

The latent electrostatic images formed in the dielectric layer 28 of charge receptor 27 thereafter developed by developer roll 40 to form a toner powder image on the charge receptor periphery. Thereafter, the toner powder image is simultaneously transferred and fixed to the copy sheet 32 at transfer/fixing station 25 through pressure engagement between charge receptor 27 and roller 30. Any residual toner powder adhering to the charge receptor periphery is removed by scraper blade 45 and any residual electrostatic image charges on the charge receptor periphery are neutralized by erase apparatus 46.

Control of ion deposition to the electrostatically chargeable layer 28 of charge receptor 27 is effected by an ion deposition control bar 50 consisting of a generally rectangular substrate 52 having a length L substantially equal to or slightly greater than the length of charge receptor 27. Control bar 50 is disposed in predetermined spaced relation to charge receptor 27 at imaging station 55 with the longitudinal axis of bar 50 being parallel to the axis of charge receptor 27. Bar 50, which is formed of any suitable non-conductive material such as silicon, has plural rows of closely spaced holes 59 therethrough. The upper side of each hole 59 is surrounded by a ring-like electrode 60 of conductive material to thereby form plural rows 57-1, 57-2, . . . 57-n of ion deposition controlling apertures 62. A continuous electrode 51 with holes 58 therein for each hole 59 in bar 50 is provided on the bottom or lower surface 56 of bar 50. The number n of rows of ion deposition controlling apertures 62 is equal to the number of image pixels in a line of image signals. For purposes of explanation, the apertures comprising each row 57-1, 57-2, . . . 57-n are identified as 62-1-1, 62-1-2, . . . 62-1-n for row 57-1, by the numerals 62-2-1, 62-2-2, . . . 62-2-n and so on. Apertures 62 are relatively small, a suitable diameter being of the order of 0.005 inches.

A coronode wire 53 adapted to generate a predetermined quantity of ions along its length, is provided in preset spaced relation to control bar 50. The ion emission length of wire 53 is substantially equal to the length L of control bar 50. Wire 53 is coupled to a suitable source of electrical potential 54, with the axis of wire 53 parallel to the axis of charge receptor 27.

Control bar 50 is disposed between and in predetermined operative spaced relation to the dielectric layer 28 of charge receptor 27 and coronode wire 53.

Figure 1:
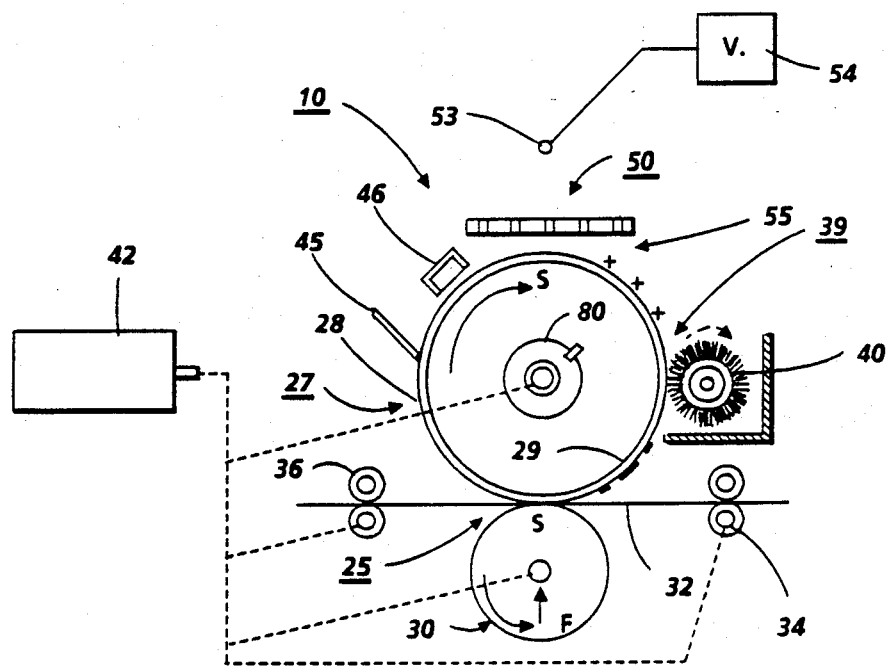
FIG. 1 is a cross section view of a digital ionographic printer incorporating the synchronized progressive ion deposition system of the present invention.
Figure 3:
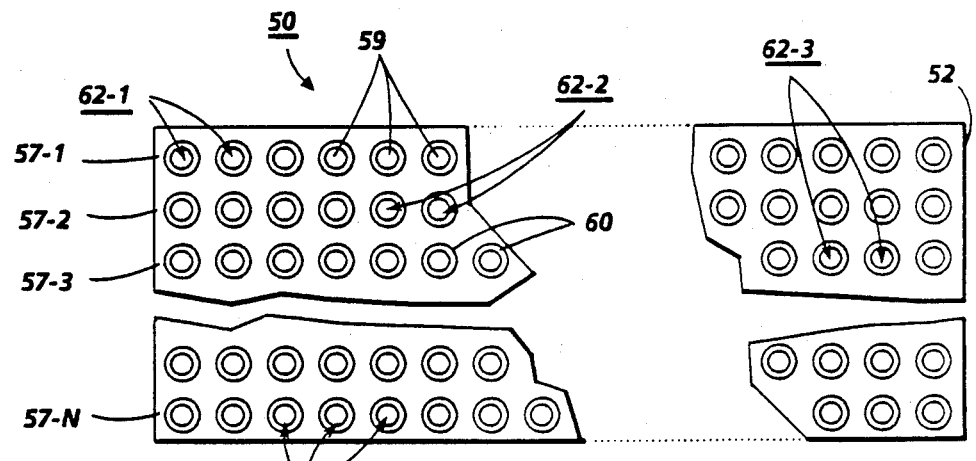
FIG. 3 is a top plan view of the control bar shown in FIG. 2.
Figure 2:
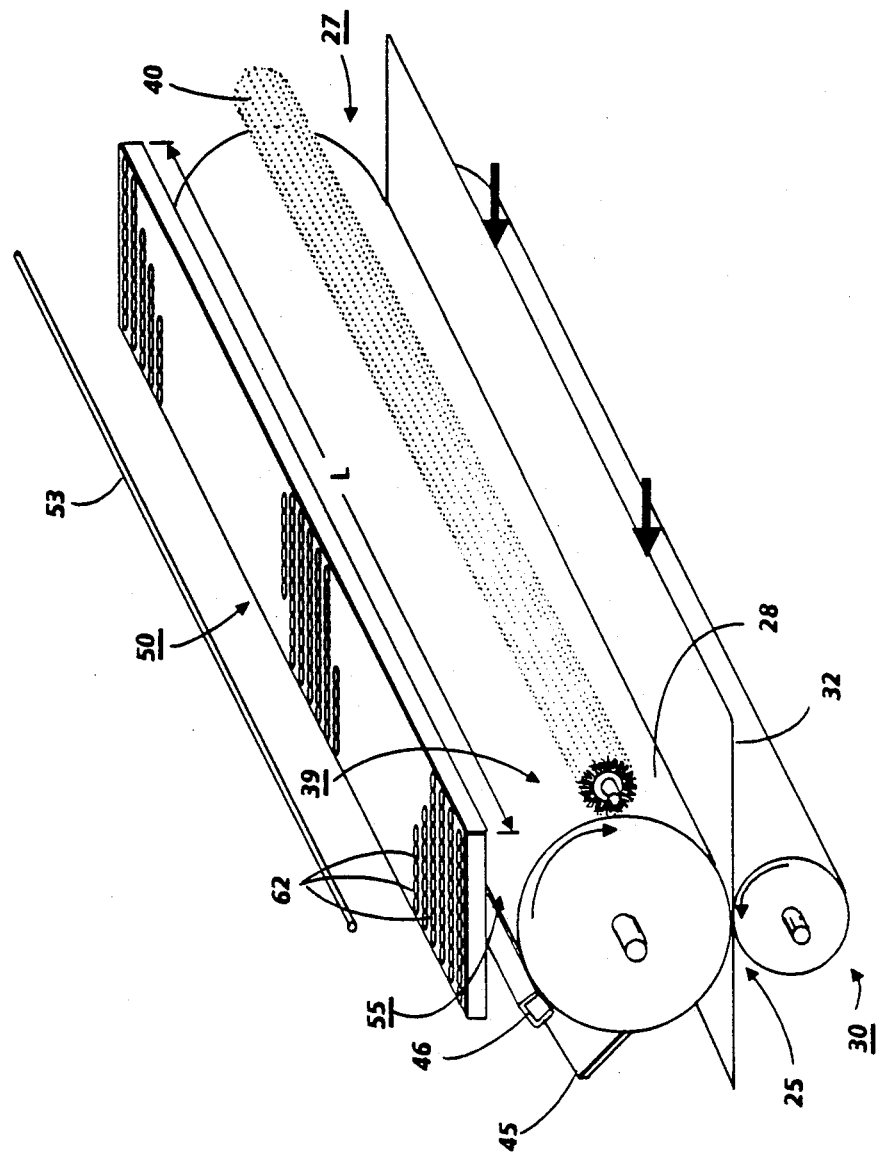
FIG. 2 is an isometric view of the ionographic printer in FIG. 1 showing details of the ion deposition control bar for achieving progressive ion deposition on the printer charge receptor.
Figure 5:
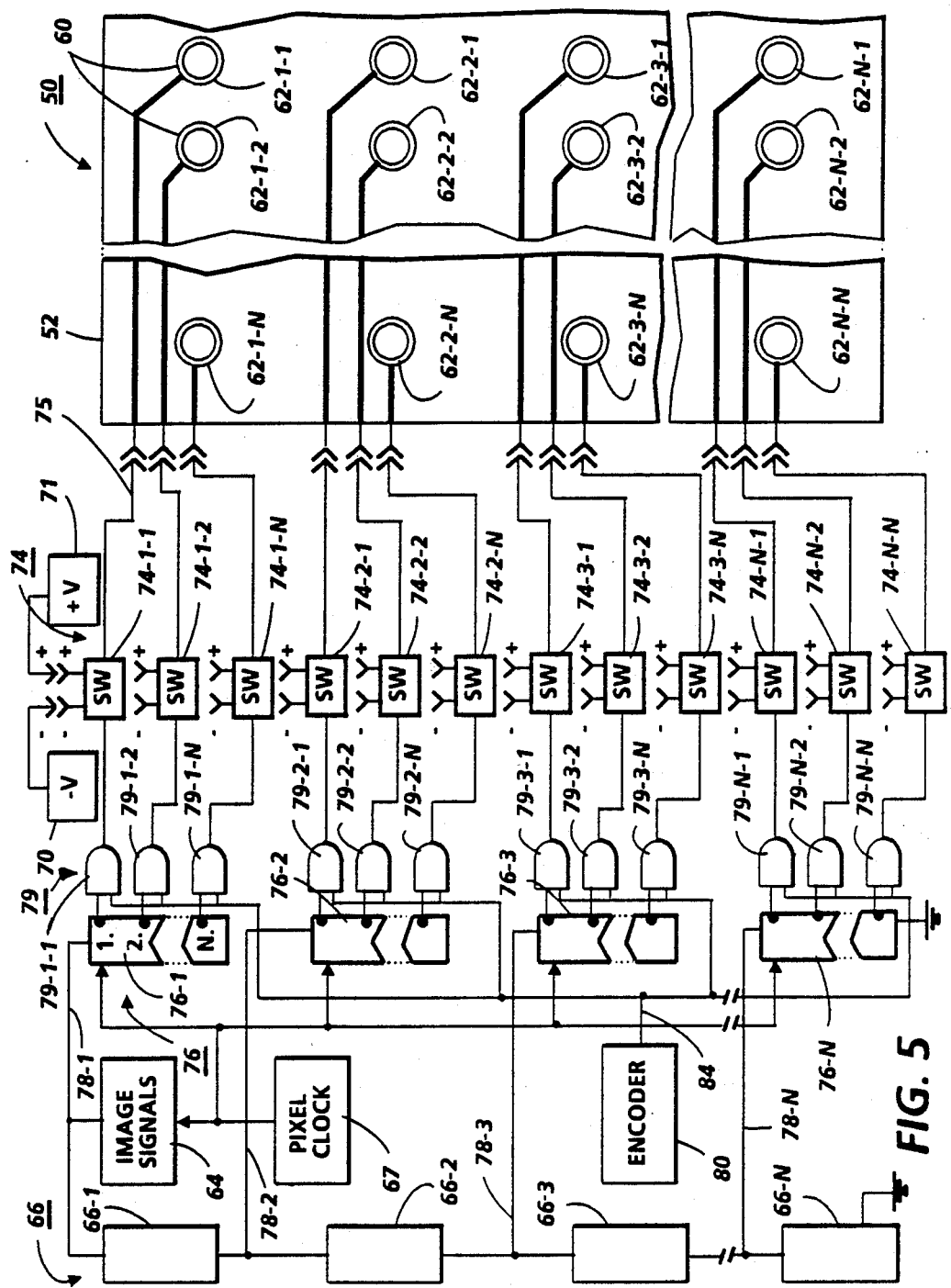
FIG. 5 is a control schematic of the control system for operating the control bar to achieve progressive deposition of ions on the printer charge receptor in accordance with an image signal input.

Referring particularly to FIG. 5, a suitable image signal source 64 as, for example, a memory, communication channel, raster input scanner, etc., is provided. Image signals are output line from image signal source 64 to series connected line buffers 66-1, 66-2, . . . 66-n. The input side of each buffer 66-1, 66-2, . . . 66-n is coupled by line 78-1, 78-2, . . . 78-n to a succession of series in/parallel out shift registers 76-1, 76-2, . . . 76-n, the image signals being clocked by clock pulses from a suitable pixel clock 67.

To control the flow of ions through apertures 62, negative and positive modulation voltages $-V_M$ and $+V_M$ respectively are used. Negative and positive modulation voltages $-V_M$ and $+V_M$ respectively are derived from suitable negative (−) and positive (+) voltage sources 70, 71 respectively. Voltage sources 70, 71 are individually coupled to the electrodes 60 of each aperture 62 through control switches 74. For purposes of explanation, the control switches associated with aperture row 57-1 are identified as 74-1-1, 74-1-2, . . . 74-1-n; those with aperture row 57-2 as 74-2-1, 74-2-2, . . . 74-2-n, and so forth. The output side of each control switch 74 is coupled by a lead 75 to the electrode 60 of the aperture 62 associated therewith. Control switches 74, which are normally in a nonactuated state, couple negative votage source 70 to the aperture electrodes 60. When actuated, switches 74 couple positive voltage source 71 to electrodes 60.

The outputs of serial in/parallel out shift registers 76-1, 76-2, . . . 76-n are individually coupled to the control gate of successive control switches 74 through output gates 79. For example, output 1 of shift register 76-1 is coupled through gate 79-1-1 to the control gate of switch 74-1-1 for aperture 62-1-1 of row 57-1, output 2 of shift register 67-1 is coupled through gate 79-1-2 to the control gate of switch 74-1-2 for aperture 62-1-2 of row 57-1, output 1 of shift register 76-2 is coupled through gate 79-2-1 to the control gate of switch 74-2-1 for aperture 62-2-1 of row 57-2, output 2 of shift register 76-2 is coupled through gate 79-2-2 to the control gate of switch 74-2-2 for aperture 62-2-2 of row 57-2 etc.

To synchronize operation of control switches 74 with the movement of charge receptor 27, a suitable encoder 80 (shown in FIG.1) is provided to sense line by line movement of charge receptor 27. The control signal output of encoder 80 is coupled by line 84 to the enable terminal of output gates 79. On each movement of charge receptor 27 through a distance equal to one image line, the signal output of encoder 80 enables output gates 79 and couples the oytputs of shift registers 76-1, 76-2, . . . 76-n to the control gates of switches 74 as described.

OPERATION

During operation of printer 10, motor 42 is energized to rotate charge receptor 27, pressure roller 30, copy sheet feed roll pairs 34, 36, and develloper roll 40. Coronode wire 53 is energized from potential 54 and emits ions along the length thereof. In the example shown and discussed herein, the ions emitted by wire 53 are positive.

The image signals output from image signal source 64 are clocked line by line by the clock signals from pixel clock 67 to line buffers 66-1, 66-2, . . . 66-n. Concurrently, as each line of image signals is input to buffers 66-1, 66-2, . . . 66-n, the line of image signals is also input to shift registers 76-1, 76-2, . . . 76-n through lines 78-1, 78-2, ... 78-n respectively. Each control signal output by encoder 80 enables the output gates 79 to apply the image signal content currently held in shift registers 76-1, 76-2, . . . 76-n to the control gates of switches 74. The image signals input to switches selectively actuate switches 74 to apply either the negative or positive modulation voltages $-V_M$ respectively from negative or positive voltage sources 70, 71 respectively to electrodes 60 of ion deposition controlling aperture 62.

As demonstrated in FIG. 6, in the case where positive voltage source 71 is coupled to an electrode 60, the fringe fields created by the relatively high positive charge on the electrode tends to direct like-charge ions through the aperture 62 toward the dielectric surface 28 of charge receptor 27.

As demonstrated in FIG. 7, in the case where the negative voltage source 70 is coupled to an electrode 60, the fringe fields created by the negative charge on the electrode directs ions away from the aperture 59 and reduces the flow of the oppositely charged ions therethrough. As a result, ions do not flow through the apertures 62 to charge receptor 27.

As each line of image signals from image signals source 64 progresses from one line buffer 66 to the next, the lines of image signals are simutaneously loaded into the next shift register 76 in the shift register series. With each control signal from encoder 80, the output gates 79 are enabled to selectively regulate the bias on the electrodes 60 of each aperture 62 as described and control the deposition of ions onto charge receptor 27 to progressively build up and create the latent electrostatic image represented by the image signals. Input of each new line of image signals to line buffer 66-1 shifts the previous line of image signals the next line buffer 62-2 and loads the next line into shift register 76-1. For example, at the same time the new line of image signals is shifted into buffer 66-1, the line is loaded into shift register 76-1 while the previous line of image signals from buffer 66-1 is shifted into buffer 66-2 and loaded into shift register 76-2. The other lines of image signals currently in the remaining line buffers are similary stepped to the next line buffer (the line of image signals in the last buffer 62-n is dumped) and at the same time loaded into the shift registers 76-3, . . . 76-n.

As a result, the latent electrostatic latent images represented by each line image signals is progressively built up in step by step fashion on charge receptor charge receptor 27. The latent electrostatic images are thereafter developed by developer roll 40 and transferred to copy sheets 32 brought forward in timed relation thereto at transfer/fixing station 25 to provide finished prints.

FIG. 8 EMBODIMENT

In the embodiment shown in FIG. 8 where like numbers refer to like parts, the rows of apertures 62 in bar 50 are offset from one another to permit imaging of a block of N image lines at once. In the example shown and discussed herein, 4 image lines are processed at once. However, simultaneous processing of other combinations of image lines may be envisioned.

In this embodiment, a plurality of mullti-line drivers 90-1, 90-2, . . . 90-n are provided. Each driver comprises 4 serial in-parallel out shift registers 94-1, 94-2, 94-3, and 94-4 sized to each receive one fourth of the line of image signals. For purposes of expanation, the shift registers 94-1, 94-2, 94-3, and 94-4 of driver 90-1 are further identified by numerals 94-1-1, 94-1-2, 94-1-3, and 94-1-4 respectively, the shift registers of driver 94-2 by numerals 94-2-1, 94-2-2, 94-2-3, and 94-2-4, etc. The outputs of shift registers 94 of each driver 90 are coupled through control switches 74 to every fourth aperture 62 representing an image line. For example, the outputs of shift register 94-1-1 of driver 90-1 are coupled to apertures 62-1-1, 62-1-5, 62-1-9, etc., the outputs of shift register 94-1-2 of driver 90-1 are coupled to apertures 62-2-2, 62-2-6, 62-2-10, etc., the outputs of shift register 94-1-3 of driver 90-1 are coupled to apertures 62-3-3, 62-3-7, 62-3-11, etc., and the outputs of shift register 94-1-4 of driver 90-1 are coupled to apertures 62-4-4, 62-4-8, 62-4-12, etc.

To distribute image signals to shift registers 94 of drivers 90, an image line buffer 95-1, 95-2, . . . 95-n is provided for each driver 90-1, 90-2, . . . 90-n respectively. Buffers 95 are in series with one another, the input to buffer 95-1 being coupled to the output of image signal source 64. A 1:4 multiplexer 96-1, 96-2, .. . 96-n associated with each buffer 95-1, 95-2, . . . 95-n divides and distributes every fourth image signal of pixel in the line of image signals held in buffers 95. For example, multiplexer 96-1 provides image signals to shift registers 94-1-1, 94-1-2, 94-1-3, and 94-1-4 of driver 90-1, multiplexer 96-2 to shift registers 94-2-1, 94-22-2, 94-2-3, and 94-2-4 of driver 90-2, etc.

OPERATION OF THE FIG. 8 EMBODIMENT

Each time a new line of image signals (i.e., line L-2) from image signal source 64 is loaded into buffer 95-1, the lines of image signals in buffers 95-1, 95-2, . . . 95-n are shifted to the next buffer in the buffer series. For example, with loading of a new lline in buffer 95-1, the previous line of image signals (i.e., line L-1) is shifted from buffer 95-1 to buffer 95-2. As each line of image signals is shifted from one buffer to the next, the lines of image signals are concurrently loaded through multiplexers 96-1, 96-2, . . . 96-n into the shift registers of drivers 90-2, 90-3, . . . 90-n. On a control signal from encoder 80 reflecting movement of charge receptor 27 through one image line, the electrodes 60 of apertures 62 are seectively coupled to negative or positive voltage sources 70, 71 respectively in the manner described in the previous embodiment to control ion deposition through apertures 62. At the same time, the repeated application of each image line progressively builds up the charge levels of the image line on charge receptor 27.

In both embodiments, it will be understood that electrodes 60 function both to modulate the flow of ions through the apertures 62 and to buffer the modulated information through the entire ion deposition time period. In the case of the former, the flow of ions is modulated according to the magnitude of fringe fields developed by the electrodes. Buffering enables progressive ion deposition to occur over the entire ion deposition zone, with retention of the input information pattern produced until transfer to charge receptor 27.

It is noted that image spot location may be controlled through appropriate timing of the modulation pulses. For example, split modulation electrodes may be employed to increase the number of addressable locations in the fast scan direction by allowing lateral steering of the ion beams due to differential biasing of the split electrode halves.

In image bar "like" printing systems having single elements to address each location in the fast scan direction, failure of an element typically produces a continuous line artifact (i.e., dark or light) in the output copy or print. Such systems incude LCD or LED xerographic printers and ionographic printers. Because of the multiple aperture ion deposition basis of the printer 10 of the present invention, the loss of a single aperture as for example 1 out of 8, can be expected to be less catastrophic since $\frac{7}{8}$ of the ion depositions would still occur.

The present invention allows a substantial increase in the operating speed of ionographic printers of the type described herein. Additionally, the ion flow modulation achieved by fringe fields normal to the surface of charge receptor 27 permits ion deposition size to be controlled which, in turn, allows image density or gray scale control. The ability to control spot size and produce small spots is thought to be due, at least in part, to the reduction in ion beam spreading due to the space charge created as a result of the low ion current densities required. As a result, the proposed printer has the advantage of eliminating the need to pre-charge the charge receptor to achieve the high projection fields employed.

In essence, the combination of spot size and spot control achieved by the present invention combine to increase the number of addressable spots to greater than the number of screen aperture per unit area. As a result, fairly coarse and therefore robust photoconductive electrode structures can achieve high copy quality levels in the present invention.

Also, as will be understood, level writing in printers enables generation of gray scale output. Advantages of the ability to write in levels are particularly important for color printing systems. And, some enhanced alphanumeric print quality approaches also depend upon the ability to write levels. In most systems, level-writing in based upon the analog transfer relationship between the modulation input signal and the resulting output. Uniformity and stability of this analog relationship is critical, making it necessary in some cases to include feedback loops to detect and stabilize performance. The present invention, which has n ion deposition increment groups, could "write" at n+1 different levels of charge deposition by digitally addressing (i.e., "on" or "off") apertures in each group. Because such a system would be independent of the shape of the analog transfer relationship, enhanced system stability without feedback woulld be anticipated.

While the invention has been described with reference to the structure disclosed, it is not confined to the details set forth, but is intended to cover such modifications or changes as may come within the scope of the following claims.

I claim:
1. In an ionographic image printing apparatus, the combination of:
   (a) an ion generator;
   (b) a movable charge receptor;
   (c) an ion deposition control bar operatively interposed between said ion generator and said charge receptor for modulating the flow of ions produced by said ion generator to said charge receptor,
   said control bar having n parallel rows of apertures therethrough extending in a direction substantially perpendicular to the direction of movement of said receptor,
   each of said apertures having a control electrode for controlling the flow of ions through said apertures;
   (d) a source of image signals for providing images for printing;
   (e) image signall processing means for separating said image signals into successive lines and providing a block of n lines for use in controlling the flow of ions through said rows of apertures;
   (f) line stepping means operative on each movement of said charge receptor through a distance of one line to step the position of the lines in said block of lines by one step while providing the next successive line of image signals to the first step in said block of lines;
   (g) modulating means for modulating said electrodes, said modulating means providing a first modulating potential facilitating the flow of ions through said apertures and a second modulating potential inhibiting the flow of ions through said apertures; and
   (h) control means for selectively coupling said first or second modulating potentials to said electrodes individually in accordance with the image signal content of said lines in said block of lines whereby to provide a controlled line by line build-up of ions on said charge receptor in accordance with the image signal content of the lines in said block of lines.

2. The printing apparatus according to claim 1 in which the number of apertures in each of said rows corresponds to the number of pixells in said line.

3. The printing apparatus according to claim 1 in which said control means is adapted to couple said first and second modulating potentials each time distribution of each line said image signals is completed.

4. The printing apparatus according to claim 1 in which the apertures comprising each of said rows are subdivided into groups comprising a preset number of apertures, said apertures in said groups being progressively offset from one another;
   said image signal processing means separating each of said lines of image signals into groups having a preset number of pixels equal to the number of apertures in said aperture groups.

5. The printing apparatus according to claim 1 in which
   (a) said image signal processing means incudes plural line buffers in series with one another, there being one line buffer for each row of said apertures, the input terminal of the first of said series being coupled to said image signal source whereby on input of each fresh line of image signals to said first buffer, the lines of image signals previously in said buffers are shifted serially to the next buffer in said series; and (b) means for outputting a fresh line of image signals to said first buffer in response to movement of said charge receptro through a distance equal to one line.

6. The printing apparatus according to claim 5 in which (a) said line stepping means incudes a serial in/parallel out shift register associated with each of said line buffers for receiving the line of image signals in the buffer associated therewith;

(b) plural control switches, there being one control switch for each of said apertures, the output terminals of said switches being coupled to individual ones of said aperture electrodes;

(c) said control switches in a first switch state coupling said first modulating potential to said control electrodes and in a second switch state coupling said second modulating potential to said control electrodes;

(d) a control gate for each of said switches, said control gates coupling individual output stages of said shift registers to the control terminal of the control switch associated therewith;

said control gates being enabled on each movement of said charge receptor through an image line whereby to couple the image signals in said shift registers to the control terminal of the switch associated therewith to set said switches in either said first of second switch state.

7. The printing apparatus according to claim 1 in which said control means includes switch means for coupling said first or second modulating potentials to said electrodes individually, said switch means being enabled on each movement of said charge receptor through an image line.

8. Apparatus for controlling the operation of a matrix of ion deposition points of an electrostatic printer, comprising:

(a) an ion source;

(b) a movable charge receptor on which latent electrostatic images are formed for printing through ion deposition;

(c) an ion deposition control bar interposed between said ion source and said charge receptor having plural apertures for the passage of ions from said ion source to said charge receptor, each of said apertures having a control electrode for controlling the flow of ions through said apertures, said apertures being arranged in pural parallel rows, the number of apertures in each of said rows being equal to the number of image signals in each line of image signals, said rows being perpendicular to the direction of charge receptor movement;

(d) image data processing means for receiving a digital image input signal, said image data processing means processing said digital image signal into a plurality of image data lines, each image data line having the same number of pixels, the number of pixels being the same as the number of apertures in each line;

(e) memory means connected to the data processing means for temporarily storing a number of image data lines equal to the number of said aperture rows;

(f) control means responsive to the movement of the charge receptor through a distance equal to one line for selectively actuating said aperture eectrodes in accordance with the image pixel content of the image lines stored in said memory means whereby to provide partial charge depositions on said charge receptor for each of said lines, said control means continuously operating in accordance with the date in said memory means whereby a pattern of charges is deposited on said charge receptor corresponding to the image content of said digital image input signals.

9. The apparatus according to claim 8 in which said charge receptor comprises a rotatable electrostatically chargeable drum; and (a) means for applying a toner to the latent electrostatic image on said drum to form a toner image;

(b) means for transferring and fixing said toner image to a copy material; and (c) means for removing residual toner and electrostatic charge from said drum.

10. In a method of image reproduction using an ion modulating bar for receiving an information containing signal of sequentially input pixels on a line by line basis and for forming on a relativey moving charge receptor an image corresponding to the information contained in the signal, said ion modulating bar having plural rows of apertures substantially perpendicular to the direction of charge receptor relative movement and through which ions are directed to form portions of the image at points on the charge receptor substantially corresponding to the locations of the apertures, each aperture having an ion deposition control electrode associated therewith to control the flow of ions through said apertures in response to said information containing signal, the steps of:

(a) dividing said ion modulating bar into a plurality of individual rows of apertures, each of said aperture rows extending perpendicular to the direction of charge receptor movement, each of said aperture rows having a predetermined number of said apertures such that each of said aperture rows is individually actuable to impress on a corresponding line portion of said charge receptor a line of charges corresponding to the information signal applied to that row of apertures;

(b) receiving said information signal and temporarily storing plural sequentially input line portions thereof, said stored line portions containing a predetermined number of image pixels corresponding to the number of apertures in each of said rows;

(c) associating an individual one of said stored line portions with each of said aperture rows and actuating the aperture electrodes in said rows of apertures to control the movement of ions through said apertures in response to the image information in said stored line portions to provide partial lines of image charges on said charge receptor; and (d) repeating steps b and c in response to movement of said charge receptor through one line whereby to progressively build up a complete image charge on said charge receptor.

* * * * *